Figure 1:
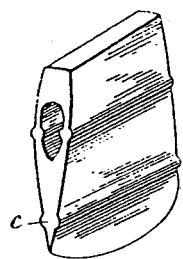

(No Model.)

E. THOMSON.
MANUFACTURE OF AXES.

No. 476,967.  Patented June 14, 1892.

Witnesses

Inventor
Elihu Thomson
By his Attorney

UNITED STATES PATENT OFFICE.

ELIHU THOMSON, OF LYNN, MASSACHUSETTS, ASSIGNOR TO THE THOMSON ELECTRIC WELDING COMPANY, OF MAINE.

MANUFACTURE OF AXES.

SPECIFICATION forming part of Letters Patent No. 476,967, dated June 14, 1892.

Application filed January 22, 1889. Serial No. 297,163. (No model.)

*To all whom it may concern:*

Be it known that I, ELIHU THOMSON, a citizen of the United States, and a resident of Lynn, in the county of Essex and State of Massachusetts, have invented a certain new and useful Improvement in the Manufacture of Axes and other Tools, of which the following is a specification.

My invention relates to certain improvements in the manufacture of axes, adzes, hammers, and similar tools, and has for its object rapidity and cheapness in construction, together with strength and durability in the product.

A further object of my invention is to improve the process of manufacturing tools which, like axes, have a cutting-edge.

The invention relates more particularly to those tools which, like an ax, have an eye for the insertion of a handle; but I do not wish to be understood as limiting myself to the application of my invention to the manufacture of axes alone.

In the formation of the poll or ax-body of an ax after the usual manner it is difficult to form the eye, the forging being apt to come out in an exceedingly rough condition, necessitating considerable after grinding or finishing.

The process heretofore adopted in making the bit portion of the ax is also a difficult one, as it is not easy to properly prepare the poll and the blade or cutting-edge by the usual welding process.

In manufacturing the bit portion of the ax the practice has heretofore been to join a blank to the body or poll and then after the joining or welding of the two to form or draw down the bit or cutting-edge. This is an operation requiring the exercise of considerable skill and adds greatly to the cost of manufacture.

My invention avoids or lessens the difficulties incident to the process of manufacturing axes and similar tools by the methods heretofore employed; and it consists, essentially, in separately forming or shaping the parts of an ax or similar tool, whether it be the bit and the body, the body and the head, or all three of these parts, and then welding such parts together, thus making an article requiring but the removal by grinding of slight burrs or ridges to complete it. In forming the separate parts I may use the process of forging in which suitable dies having the shape of the finished parts are employed.

My invention consists, also, in separately shaping or forming the bit and the poll of an ax and then welding such parts together.

By the term "poll" I mean all that portion of the ax which contains the body, the head, and eye.

My invention consists, also, in constructing the poll by separately forming the head and the body portion and welding the two together on a line or in a plane which intersects the sides of the completed ax, or, in other words, in a plane transverse to the general plane in which the head, body, and plate lie. This plane may pass through the middle of the eye as near as may be or may be to the side of the axial line and even at the top or bottom edge of the eye, each piece being in any case, however, a counterpart of the other, so that when the two are joined a complete poll or eye portion will result.

As neither piece separately requires a perforation or eye, it is obvious that the formation of the pieces is a simple matter and that drop-forging may be practiced with great facility in forming all surfaces and with clean true edges.

Figure 2:
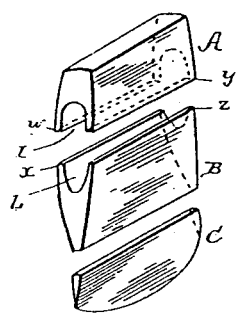
Figure 3:
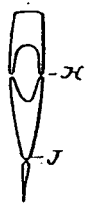
Figure 4:
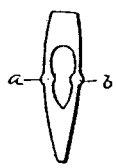
Figure 5:
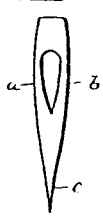
Figure 6:
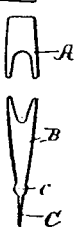
Figure 7:
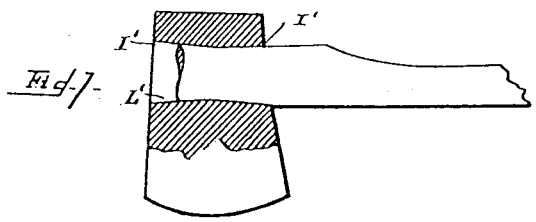

In the accompanying drawings, Figure 1 is a perspective view of an ax made in accordance with my invention. Fig. 2 is a view of the several parts from which the ax is made. Fig. 3 is an end view of the parts modified at their welding surfaces or edges. Fig. 4 is a detail. Fig. 5 shows an end view of the ax finished. Fig. 6 illustrates a modification of the process. Fig. 7 is a partial vertical section of a complete ax.

The shapes of the separate pieces, such as hereinafter described, are shown in Fig. 2.

A represents the head of the ax and may be made either of wrought-iron, mild steel, fine tool-steel, or any other desirable material by drop-forging or other process. The groove I may be forged so as to rise in the middle of the ax, thus making its deepest portion at I' at the ends of the groove, as is shown in section in Fig. 7. The middle piece B of the ax is more flattened than the head-piece and tapers at its lower side, in order that the cutting-edge piece may be fitted and welded neatly to it. The groove L may be forged, so as to rise in the middle, as described above, as is shown at L', Fig. 7. This center piece may of course be composed of any desirable metal. By this conformation of the grooves the usual taper of the eye from both ends is secured.

The third piece or edge of the ax is shown in Fig. 2 at C and is generally made of tool-steel, though sometimes it may be desirable to make it of a lower grade of metal. After I have formed the pieces represented in Fig. 2 by means of ordinary dies in drop-forging from hot metal or by casting the pieces or in any other desirable manner, they are then welded together, preferably by being placed on the holding-clamps of an electric welding machine and passing currents of electricity through them of a power sufficient to fuse and unite the four edges $w\,x\,y\,z$ when placed in abutment, thereby forming the poll or body of the ax, as shown in Fig. 4. Both of the welds at $w\,x\,y\,z$ are thus made at one operation and at a uniform temperature over the whole sectional area on both sides of the "eye" of the ax.

The letters $a$ and $b$, Fig. 4, represent the burrs or expansions which may result from the pressure given in the welding process. These expansions may be removed by forging or grinding or in any desirable manner either at this stage of the formation of the ax or after the ax is completed; or the form of the abutting ends of the pieces may be so shaped as to entirely do away with the burrs. The shape of the pieces would then be as shown in Fig. 3, where the ends to be abutted taper slightly, as shown at H and J. The rib or expansion formed inside the eye of the body of the ax may in some cases be left intact and will be found a desirable means of securing the handle more firmly to the ax, inasmuch as it prevents side-play of the handle in the eye by engaging with the grooves formed in the handle by such rib when the handle is forced into the eye. The poll or the body of the ax, which is formed in the manner above described, is then placed in one of the clamps of a welding-machine, and a piece (such as is shown at C in Fig. 2) which has been formed in any desirable manner, as by drop-forging, and which may be composed either of fine tool-steel or of low steel or of wrought-iron, as is desired, is then placed in the other clamp of the welding-machine and the two are welded according to the principles of my invention referred to in the first part of this specification. The bulge or expansion $c$, Fig. 1, if any objectionable amount has been raised, may now be removed by grinding or forging, or in any desirable manner and the ax finished.

Fig. 5 is a view of the complete ax with expansions at $a\,b\,c$ ground and cleaned off. It is plain that the grinding of these expansions may be done either after each weld is finished or after both have been made, or, as stated above, it is possible to so weld the pieces as to leave little, if any, rib or expansion. It is also equally obvious that the two pieces B and C represented in Fig. 2 may be joined first, as indicated in Fig. 6, and the piece A welded to the piece thus formed.

I do not limit myself to any order of welding nor to any particular welding process, but claim, broadly, the improvement in ax-making which consists in forming the ax from three pieces of metal comprising a blade-piece, middle piece, and head-piece, as described above, welded together, as described.

The advantages of this method of manufacturing axes are obvious. Some of them may be mentioned.

The piece A, Fig. 2, may be drop-forged in a semi-finished condition, as may also the piece B, (illustrated in Fig. 2,) so that little or no finishing may be required to perfect the ax.

The eye in my improved ax is formed by the junction of the two pieces A and B, (shown in Fig. 2,) and it is not, therefore, necessary to forge a hole in the poll of the ax with an arbor, as in the usual method of manufacture.

The two pieces A and B shown in Fig. 2 are more easily formed than the poll now used by ax manufacturers, and a saving of time is therefore effected.

Other advantages are a saving of material by doing away with grinding and the saving of heat by the application of electric welding.

Figs. 1 and 2 show the joint between pieces B and C straight. It is often better to make it curved, so as to be nearly parallel to the curve of the cutting-edge of C. This is easily done by forming the meeting portions of pieces B and C with curved instead of straight outlines.

What I claim as my invention is—

1. The herein-described improvement in manufacturing axes or other tools, consisting in shaping the several parts thereof separately to finished form and then welding such parts together, as and for the purpose described.

2. In the art of making axes, the improvement which consists in shaping separately the steel cutting-bit and body portion or part to which it is joined each to finished form and with correspondingly-shaped ends, passing through said parts an electric current, heating them thereby, and welding them together by contact, substantially as and for the purpose described.

3. The herein-described improvements in the manufacture of tools having an eye for the insertion of a handle, consisting in separately forming or shaping two pieces adapted to be welded together on a plane which intersects the eye and the sides of the tool and then uniting said parts on such plane by the electric welding process, as and for the purpose described.

Signed at Lynn, in the county of Essex and State of Massachusetts, this 17th day of January, A. D. 1889.

ELIHU THOMSON.

Witnesses:
J. W. GIBBONEY,
E. W. RICE, Jr.